(12) United States Patent
Lane (10) Patent No.: US 11,913,577 B2
(45) Date of Patent: *Feb. 27, 2024

(54) CONVERTER HOSE AND METHODS OF USE

(71) Applicant: Lisa A. Lane, Clarksburg, NJ (US)

(72) Inventor: Lisa A. Lane, Clarksburg, NJ (US)

(73) Assignee: Drug Careers Inc., Clarksburg, NJ (US)

( * ) Notice: Subject to any disclaimer, the term of this patent is extended or adjusted under 35 U.S.C. 154(b) by 408 days.

This patent is subject to a terminal disclaimer.

(21) Appl. No.: 17/397,998

(22) Filed: Aug. 10, 2021

(65) Prior Publication Data

US 2021/0381631 A1 Dec. 9, 2021

Related U.S. Application Data (63) Continuation of application No. 16/536,248, filed on Aug. 8, 2019, now Pat. No. 11,085,567, which is a continuation of application No. 15/061,816, filed on Mar. 4, 2016, now Pat. No. 10,393,300.

(60) Provisional application No. 62/128,605, filed on Mar. 5, 2015.

(51) Int. Cl.
| | |
|---|---|
| *F16L 37/04* | (2006.01) |
| *F16L 11/00* | (2006.01) |
| *F16L 37/26* | (2006.01) |
| *F16L 37/48* | (2006.01) |
| *B05B 1/18* | (2006.01) |

(52) U.S. Cl.
CPC ............ *F16L 37/04* (2013.01); *F16L 11/00* (2013.01); *F16L 37/26* (2013.01); *F16L 37/48* (2013.01); *B05B 1/18* (2013.01)

(58) Field of Classification Search
CPC ..... F16L 37/48; F16K 27/0209; F16K 15/063
See application file for complete search history.

(56) References Cited

U.S. PATENT DOCUMENTS

| | | | |
|---|---|---|---|
| 1,322,753 | A | 11/1919 | Blair et al. |
| 1,543,558 | A | 5/1921 | Donald |
| 1,383,987 | A | 7/1921 | DeBellis |
| 1,921,094 | A | 8/1933 | Patterson |
| 1,984,347 | A | 11/1933 | Sutton et al. |
| 1,939,204 | A | 12/1933 | Conklin |
| 2,071,842 | A | 2/1937 | Kennedy |
| 2,244,280 | A | 6/1941 | Elle |
| 2,261,500 | A | 11/1941 | Lewis |

(Continued)

FOREIGN PATENT DOCUMENTS

| | | |
|---|---|---|
| GB | 0484210 | 5/1938 |
| JP | 2009293688 | 12/2009 |

OTHER PUBLICATIONS

Kipp, Dale O. (2004; 2010).Plastic Material Data Sheets MatWeb, LLC. (http:/app.knovel.com/hotlink/toc/id:kpPMDS0001/plastic-material-data/plastic-material-data); May 7, 2008.

(Continued)

*Primary Examiner* — P. Macade Nichols
(74) *Attorney, Agent, or Firm* — Favorito Law LLP; Carolyn Anne Favorito (57) ABSTRACT

A converter hose includes a self-sealing connector coupled to a hose. Related methods include attaching the converter hose to a shower head, faucet or spigot.

20 Claims, 5 Drawing Sheets

(56) References Cited

U.S. PATENT DOCUMENTS

| | | |
|---|---|---|
| 2,273,837 A | 2/1942 | Davies |
| 2,326,479 A | 4/1943 | Mejdrich |
| 2,383,235 A | 8/1945 | Brown |
| 2,507,535 A | 5/1950 | Madsen et al. |
| 2,584,044 A | 5/1950 | Osrow et al. |
| 2,711,331 A | 6/1955 | Temple |
| 3,131,868 A | 5/1964 | Coleman |
| 3,515,413 A | 6/1970 | Beall |
| 3,638,968 A | 2/1972 | Barks |
| 3,770,200 A | 11/1973 | Bauer et al. |
| 3,844,586 A | 10/1974 | Olen |
| 4,413,362 A | 11/1983 | Chianco et al. |
| 4,784,184 A | 11/1988 | Gates |
| 5,028,077 A | 7/1991 | Hurst |
| 5,743,570 A | 4/1998 | Garland |
| 6,058,543 A * | 5/2000 | Thompson ............. A46B 11/06 401/289 |
| 6,315,220 B1 | 11/2001 | Grubb |
| 6,738,995 B1 | 5/2004 | Payne et al. |
| 8,430,134 B2 | 4/2013 | Gill |
| 9,080,320 B1 | 7/2015 | Taylor |
| 10,393,300 B1 * | 8/2019 | Lane ....................... F16L 37/48 |
| 2009/0133886 A1 | 5/2009 | Van Noord et al. |
| 2013/0160201 A1 | 6/2013 | Okubo |
| 2017/0209640 A1 | 7/2017 | Felder |
| 2020/0316503 A1 * | 10/2020 | Jones ..................... B01D 35/04 |

OTHER PUBLICATIONS

KellerPlastics.com (www.kellerplastics.com:80/nsf-latex-free-profiles.php; Oct. 2014).

* cited by examiner

CONVERTER HOSE AND METHODS OF USE

This continuation application is a continuation of U.S. application Ser. No. 16/536,248, issued as U.S. Pat. No. 11,085,567, which is a continuation of U.S. application Ser. No 15/061,816, issued as U.S. Pat. No. 10,393,300, which are incorporated herein by reference.

FIELD

The device is in the field of converter hoses and related methods of use.

There is a need in the art for a converter hose with a self-sealing, easy to affix, slip-on-slip off connector which converts any size shower head or faucet to a hose, ideal for safely and effectively rinsing showers, animals, babies and household items.

SUMMARY

In some aspects, a converter hose may be comprised of a flexible, hollow connector having a proximal end and a distal end. The proximal end of the connector may be for releasably receiving at least a portion of the shower head, faucet or spigot. When in use, the proximal end self-seals about a periphery of the shower head, faucet or spigot. The distal end of the converter may be coupled to a first end of a flexible, hollow hose.

In some aspects, the converter hose is comprised of a thermoplastic elastomer connector having a proximal end and a distal end; wherein, when in use, the proximal end self-seals about a periphery of an existing shower head, spigot or faucet and allows a liquid to free-flow through the shower head, spigot or faucet and the connector; wherein the distal end is coupled to a first end of a hose.

In some aspects of the converter hose herein, the distal end of the connector is coupled to the first end of the hose, for example, with a clamp.

In some aspects, the converter hose further comprises a hollow nozzle coupled to a second end of the hose.

In some aspects, the connector is not made from foam.

In some aspects of the converter hose herein, the thermoplastic elastomer connector comprises a thermoplastic elastomer that has a tensile stress at least in one direction measured according to ASTM D412 at 100% strain or 300% at 23° C. of less than about 15 MPa such as about 0.05-5 MPa.

In some aspects of the converter hose herein, the thermoplastic elastomer connector comprises a thermoplastic elastomer that has a tensile strength at least in one direction at break measured according to ASTM D412 at 23° C. of about 0.1-15 MPa, such as about 0.5-5 MPa.

In some aspects of the converter hose herein, the thermoplastic elastomer connector comprises a thermoplastic elastomer that has a tear strength measured according to ASTM D624 of about 1-15 kN/m such as about 5-10 kN/m.

In some aspects of the converter hose herein, the thermoplastic elastomer connector comprises a thermoplastic elastomer that has a tensile elongation at least in one direction at break measured according to ASTM D412 at 23° C. of 50% or greater, such as is about 300%-2000%.

In some aspects of the converter hose herein, the thermoplastic elastomer connector comprises a thermoplastic elastomer that has a durometer hardness Shore Type A or Shore Type 00 value measured according to ASTM D2240 for 10 seconds at 23° C. of about 1-30, such as a durometer hardness Shore Type A of about 3-15.

A method of using the converter hose herein may comprise attaching the proximal end of the connector to a shower head, faucet or spigot. The method may further comprise flowing water though the shower head, faucet or spigot, wherein the connector self-seals about the periphery of the shower head, faucet or spigot during the flowing step.

Other features and advantages will be apparent from the following detailed description, the drawings, and the claims.

DESCRIPTION OF EMBODIMENTS

An apparatus may convert most any type or size shower head, faucet or spigot into a converter hose that allows a user to redirect the flow of water in any direction allowing the user to use the water farther from the source such as to water plants, rinse shower walls, wash animals, babies, and other objects. In some aspects, a converter hose is a non-metal, self-sealing, slip on-slip off device that may be used to safely rinse shower and tub walls, which is lightweight and portable, and where a single device can be used on many different sized fixtures, for example while moving from room to room in the house. In some aspects, the converter hose may be quickly attached to and removed from a shower head, faucet or spigot.

FIGS. 1-5 illustrate exemplary embodiments of a self-sealing, slip on and off, flexible converter hose for converting many types and/or sizes of shower heads, faucets or spigots into a self-sealing rinsing apparatus. In some aspects, the flexible converter hose is non-metal.

In some aspects as seen in the figures, the converter hose 7 includes a self-sealing, slip on slip off, connector 3, a flexible, non-metal hose 5, a clamp 4 and a nozzle 6, that may be used with an existing shower head 1. In one embodiment, a self-sealing, slip on connector 3 comprises a hollow, extremely flexible tube shaped member for receiving a shower head, faucet or spigot. The self-sealing connector 3 is comprised of a self-sealing, extremely stretchy, flexible and durable material such as a flexible thermoplastic elastomer. In some aspects, the connector is not foam.

The self-sealing connector 3, has a proximal end 10 and a distal end 11. The self-sealing connector 3 is attached, for example, to a shower head 1 by stretching and sliding the proximal end of the connector 10, over the shower head 1.

In some embodiments, a "self-sealing" connector is sufficiently flexible and has sufficient memory such that the connector does not require a clamping means, securing means, connecting means, or other mechanical means such as a ring clamp, clip, clasp, grip, a vise, a fastener, an additional flexible band, or a threaded female coupler connected to a male coupler on a spigot, to secure the connector to an existing shower head, faucet or spigot when in normal use, while preventing a substantial amount of fluid such as water to escape the proximal end of the connector during use. Thus, in some aspects, the converter hose omits the clamping, securing or connecting means at the proximal end, which may prevent the hose from slipping off the fixture and presumably prevent leakage proximate the open end of the connector, while retaining the function of leakage prevention and lack of slippage. In some embodiments, preventing a substantial amount of fluid means at least less than 10% of the amount of fluid from the source, such as less than 8%, 5%, 2% of the amount of fluid from the source, or none or almost none of the fluid, escapes during use, for example when the water is flowing at least at a medium pressure, and not merely a very light pressure. In some aspects, no fluid or almost no fluid such as less than 1%, 0.1%, or 0.01% of the water flowing through the converter hose escapes the proximal end of the connector when in use, or all or substantially all of the fluid passes through the distal end of the connector to the hose.

Without being bound by theory, it appears that the self-sealing connector, when in use, allows the free flow of water through the connector that forms a vacuum seal about the periphery of a shower head, faucet or spigot, while the connector concomitantly has sufficient elastomeric properties to directly contact and grip a larger percentage of the shower head's, faucet's or spigot's surface area to counter the force from the flow of liquid that would be sufficient to cause other, more rigid connectors, which may be unable to grip such a large surface area on shower heads, faucets or spigots of varying sizes, to detach. In some aspects, the length of the connector that directly contacts a shower head, faucet or spigot when in use (see e.g., FIG. 3) is at least about 30% the length in its resting state (see e.g., FIG. 1) from the center of an opening on the proximal end to the center of the opening of the distal end of the connector, such as 40%, 50%, 60%, 70%, 80%, 90% or 100%. In some aspects, the connector and the fixture do not have significant air pockets, water-holding passages, or an additional part situated between the connector and the fixture when in use, thus allowing direct contact and self-sealing around a fixture when in use.

U.S. Pat. Nos. 6,315,220, 4,413,362, 6,738,995 2,584,044, 2,326,479 5,028,077, and 1,383,987, refer to apparatuses for various uses. Conventional apparatuses for converting a faucet or existing shower head, unlike aspects of the self-sealing connector herein, may include a clamp, clamping means, or a mechanical fastener such as the mechanical slide fastener for securing a connector around a faucet or existing shower head. Conventional apparatuses may also require a spout to be coupled to a specialized nipple such as a corrugated nipple or a "casing part" (U.S. Pat. No. 2,507,535) with "retarding passages". In some aspects, the connector herein allows the free flow of a liquid therethough when in use. Conventional apparatuses, unlike aspects of the self-sealing connector, herein may also comprise rigid tubing or other rigid connectors, such as rigid plastic or metal tubing or connectors that connect the shower head or faucet, or insufficiently flexible materials such as foam, a relatively rigid rubber, or a thermoset rubber. In some aspects, the same self-sealing connector is sufficiently flexible to accept different sizes or types of existing faucets.

Further, in some aspects the self-sealing connector herein does not require internal protrusions or structures to retain its self-sealing properties when in use, and the connector may be of a uniform thickness 14.

For example, U.S. Pat. No. 6,315,220 recites an "apparatus for converting a faucet or existing shower head into a flexible and extendable shower apparatus which includes an adaptable connector having one end for receiving a faucet or existing shower head . . . [and a] clamping means for releasable [sic] securing the adaptable connector around a faucet or existing shower head." In addition, this patent states that a "clamp 18 may be formed within the adaptable connector 12 to form an integral part of the adaptable connector 12. Clamp 18 can be cinched together decreasing its circumference so that the adaptable connector 12 is securely fastened about an existing faucet or shower head. Alternative means for releasable [sic] securing the adaptable connector 12 to an existing faucet or showerhead include a clip, clasp, grip, a vise, a fastener, a flexible band, or any other mechanical means that would result in a nonleak seal between the faucet and adaptable connector 12."

In addition, U.S. Pat. No. 6,738,995 refers to "an attachment unit or funnel that is placed over a faucet . . . . The attachment unit is generally cylindrical and made of a solid foam that has a closed cellular structure. The attachment unit can be screwed on and off the upper end of the hose. In a first preferred embodiment the attachment unit is configured for standard faucets, with an opening in the center of its top and a vertical channel. In a second preferred embodiment the attachment unit is configured for contemporary faucets, with an opening in the side and a curved channel." Further, the "attachment unit is made of solid foam . . . ."

Further, U.S. Pat. No. 2,584,044 states "the ring is removable and the tension of the rubber holds the connector firmly on the spout."

Also, U.S. Pat. No. 2,326,479 recites "a resilient, integral flange 5 which is adapted to be forced upwardly on the spout 2 in a manner to seal the connection against leakage. This also assists in frictionally securing the device in position on the faucet."

U.S. Pat. No. 5,028,077 states "the adapter feature means for positioning and retaining a clamp at locations whereat clamping action will effect a more positive liquid-tight seal of the adaptor about a water outlet."

In another example, U.S. Pat. No. 9,080,320 states "the boot 10 encompasses the existing shower head 36, and is secured to the supply line 38 by a thumb handle hose clamp 34, which thumb handle hose clamp encircles the neck 18 of the boot."

JP 2009293688 refers to (as translated) "a connecting means 27 for connecting the joint body 21 to the faucet 18."

U.S. Pat. No. 1,984,347 states "the shell or body of the coupling . . . is preferably formed of rubber somewhat stiffened to give sufficient strength to the body without destroying the elasticity. This elastic shell is provided with a mouth portion having an end wall 2 of a thickness sufficient to render the mouth self-sustaining so that it will substantially maintain its shape when slipping the coupling over the faucet or other pipe 3 . . . ."

U.S. Pat. No. 3,638,968 refers to "a faucet adapter fastener 16 which is wound around and fastened to a conventional faucet 17."

U.S. Pat. No. 1,543,558 refers to "[a] wing nut 8 screws on the outer end of the screw 7 against the end of the tube 6, whereby the wire 5 is contracted around the sleeve 1 and said sleeve clamped around the end of the faucet which fits in the conical interior end of the sleeve."

U.S. Pat. No. 2,507,535 states "[w]hen the faucet is turned on, water passes downwardly to chamber 20 and then to the retarding passage 21 or 21'. A back pressure is thus built up in the chamber 26 . . . with the result that the sleeve portion is tightly forced against the faucet so as to provide a leak-proof joint around the faucet end."

In some embodiments, the connector comprises a thermoplastic elastomer or any other material or mixture of materials that has similar properties. Some materials have been referred to as "super elastic plastic." In some aspects, thermoplastic elastomers (TPEs) may comprise polymers or copolymers or blends of thereof that are formulated to provide the properties outlined below. For instance, TPEs may contain block copolymers such as styrene based block copolymers including styrene-ethylene, butylene-styrene block copolymers, styrene-ethylene, propylene-styrene block copolymers, styrene-ethylene, propylene block copolymers, styrene-ethylene, ethylene propylene-styrene block copolymers, partially hydrogenated products of styrene-isoprene, butadiene-styrene block copolymers, styrene-butadiene-styrene block copolymers, or styrene-isoprene-styrene block copolymers, or a combination thereof. Thermoplastic urethanes also may be useful and may be formulated to provide appropriate properties. In some aspects, TPEs may contain a styrene butadiene styrene block copolymer or styrene ethylene butadiene styrene block copolymers.

In some aspects the TPE connector can be stretched a sufficient amount to accommodate various size shower heads, faucets or spigots, yet after being fitted on the shower head, faucet or spigot, the connector will have elastomer properties such that upon contraction, the connector self-seals about a periphery of the shower head, faucet or spigot, and when removed the connector may return to its resting shape. In some aspects, the connector having the same size in its resting state could accommodate a range of shower heads, faucets or spigots that are at least twice the size relative to the other, for example, 2-20 times the size relative to another such as 2-10, 4-16, 3-8, or 5-8 times the size relative to another. Thermoplastic elastomers or super elastic plastics are commercially available under trade names such Kraton® D2104, Dynaflex® G6713-001, Dynaflex® G6713C, Versaflex® OM9-802CL or Versaflex® CL2000X. Some or all commercial TPEs are proprietary polymers or copolymers, or blends thereof having proprietary formulations containing components such as crosslinking agents or additives, which affect the properties identified below. TPE suppliers may readily provide materials based on one or a combination of the properties below.

For example, in some aspects, the super elastic plastic or thermoplastic elastomer may have a tensile stress at least in one direction measured according to ASTM D412 at 100% strain or 300% at 23° C. of less than about 15 MPa, such as about 0.01-10 MPa, about 0.05-5 MPa or about 0.05-3 MPa. Tensile stress of the same material may have lower values at 100% strain versus 300% strain. In some aspects, tensile stress at 100% strain at 23° C. may be less than about 10 MPa, such as about 0.01-5 MPa, about 0.03-1.5 MPa, or about 0.06-1.5 MPa, such as about 0.1, 0.2, 0.3, 0.4, 0.5, 0.6, 0.7, 0.8, 0.9, 1.0, 1.1, 1.2, 1.3, 1.4, or 1.5 MPa. Alternatively, in some aspects tensile stress at 300% strain at 23° C. may be about 0.1-10 MPa, about 0.1-5 MPa, or about 0.1-3 MPa, such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 MPa, or any range among these values.

In some aspects, the tensile strength of the super elastic plastic or thermoplastic elastomer at least in one direction at break measured according to ASTM D412 at 23° C. may be about 0.1-15 MPa, such as from about 0.1-10, 0.5-8 or 1-8 MPa, and typically have a value of about 0.5, 1, 2, 3, 4, 5, 6, 7, 8, 9, or 10 MPa, or any range among these values.

In some aspects, the tensile elongation of the super elastic plastic or thermoplastic elastomer at least in one direction at break measured according to ASTM D412 at 23° C. may be 50% or greater such as about 100%-5000%, about 200%-3000%, about 300%-2000%, or about 500%-1500%, or about 500%, 600%, 700%, 800%, 900%, 1000%, 1100%, 1200%, 1300%, 1400%, or 1500%, or any range among these values.

In some aspects, the tear strength of the super elastic plastic or thermoplastic elastomer measured according to ASTM D624 is about 1-35 kN/m, such as about 3-27 kN/m, about 5-10 kN/m, such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 kN/m, or any range among these values.

In some aspects, the durometer hardness Shore Type A or Shore Type 00 of the super elastic plastic or thermoplastic elastomer measured according to ASTM D2240 for 10 seconds at 23° C. may have a value of about 1-50, such as about 1-45, about 2-40, or about 3-15 such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or any range among these values.

The super elastic plastic or thermoplastic elastomer may have one or more of the properties above (tensile stress, tensile strength, tear strength, tensile elongation, or durometer hardness), such as tensile elongation and durometer hardness.

In some aspects, the connector, hose and other attachments related to the converter hose is made from materials that can withstand temperatures such as about 100-150° F. while maintaining the self-sealing attributes of the connector without deforming the converter hose.

The length of the connector may be sufficient to accommodate various shaped shower heads, faucets or spigots in its expanded state. The length may be, for example, from about 3-10 inches such as about 3-7 inches, about 4-6 inches or about 5 inches in length in its resting state. The connector, such as the TPE or super elastic plastic connector, in some aspects, may have a wall thickness of about 1/32" to 1/2" thick such as about 1/16" to 1/4" thick, for example, about 1/16", 1/8", or 3/16" thickness. In its expanded state, the connector may stretch in any direction (e.g. horizontally, vertically, diagonally, lengthwise, widthwise, circumferentially, etc.) in which it is expanded about 2-20 times, such as about 4-16 or about 8-10 times, in comparison to the resting state dimensions, allowing a connector having a fixed size to accommodate various size shower heads, faucets or spigots, such as those in Example 1. By any direction e.g., horizontally, vertically, diagonally, lengthwise, widthwise, or circumferentially, refers to stretching the entire connector e.g., from one end to another lengthwise, from side to side widthwise, from corner to corner diagonally, or outwardly from a diameter circumferentially, etc. When in a stretched state, for example, when fitted to an existing shower head, faucet or spigot, the connector may have a dimension such as a diameter of a cylindrical connector at its widest part of about 0.5-10 inches, for example 1-10, 1-8, 2-5 or 2-3 inches. The connector may have similar sized openings on either end or the distal end may be narrower than the proximal end, such as wherein the connector may have, at least partially, a funnel or conical shape, although the connector may be formed in any suitable shape that will accommodate a shower head, faucet or spigot of various sizes such as cylindrical, spherical, barrel shaped or prism shaped, rectangular prism, or variations thereof.

The flexible hose 5, has a first end 8, and a second end 9. The hose may be made from any material suitable for its purpose. In some aspects, a typical hose may be made from a flexible material. For example, the hose may be made from TPE, vinyl, polyvinyl chloride (PVC), silicone, or latex, The hose may be any suitable length, such about 0.5-20 m or greater. In some aspects, the hose length is about 1-3 m, such as about 1 m. The hose may be any suitable diameter, such about 1-100 mm (measured as inner or outer diameter). For example, inner diameter may be about 5-12 mm such as about a 9 mm and an outer diameter may be about 6-18 mm, such as about 15 mm. In some aspects, the hose is non-metal.

In some aspects, the first end 8 of the hose 5 may be connected to an open distal end 11 of the self-sealing connector 3 via a securing means (clamp) 4, or other securing means. In some aspects, the clamp 4 fits around the exterior circumference of the self-sealing, slip-on connector 3 at its distal end 11. The distal end 11 is secured to the first end 8 of the flexible hose 5 by sliding distal end 11 over the first end 8 of the flexible hose 5. The clamp 4 may be secured over the exterior of the distal end of the self-sealing connector 11 proximate the first end 8 of the flexible hose 5. In some aspects, the clamp component may be e.g., about ½" to 1" in width and/or has sufficient diameter to encompass the entire hose when attached to the connector. In some aspects, the self-sealing connector is positioned outside the hose.

Figure 1:
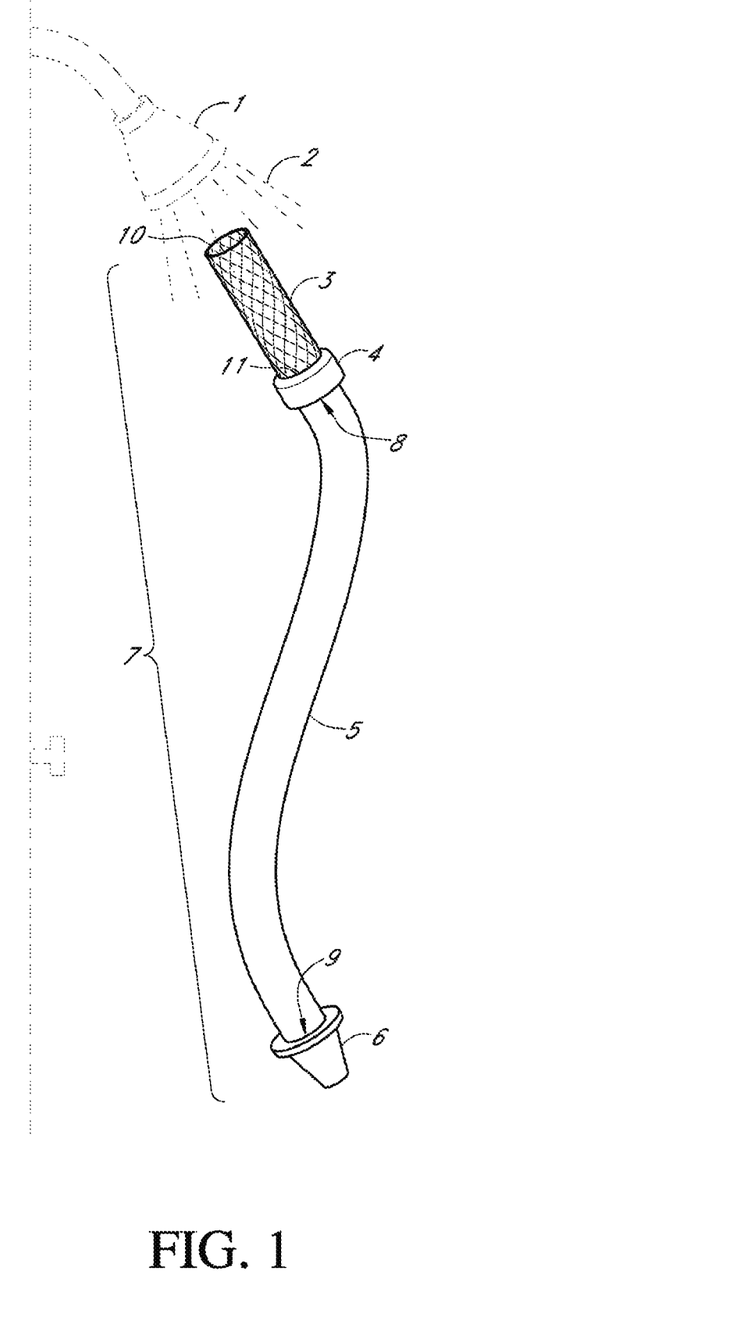
FIG. 1 is a view of an existing shower head and converter hose according to an embodiment. The nozzle on the lower end of the figure is not necessary for the converter hose to function.
Figure 2:
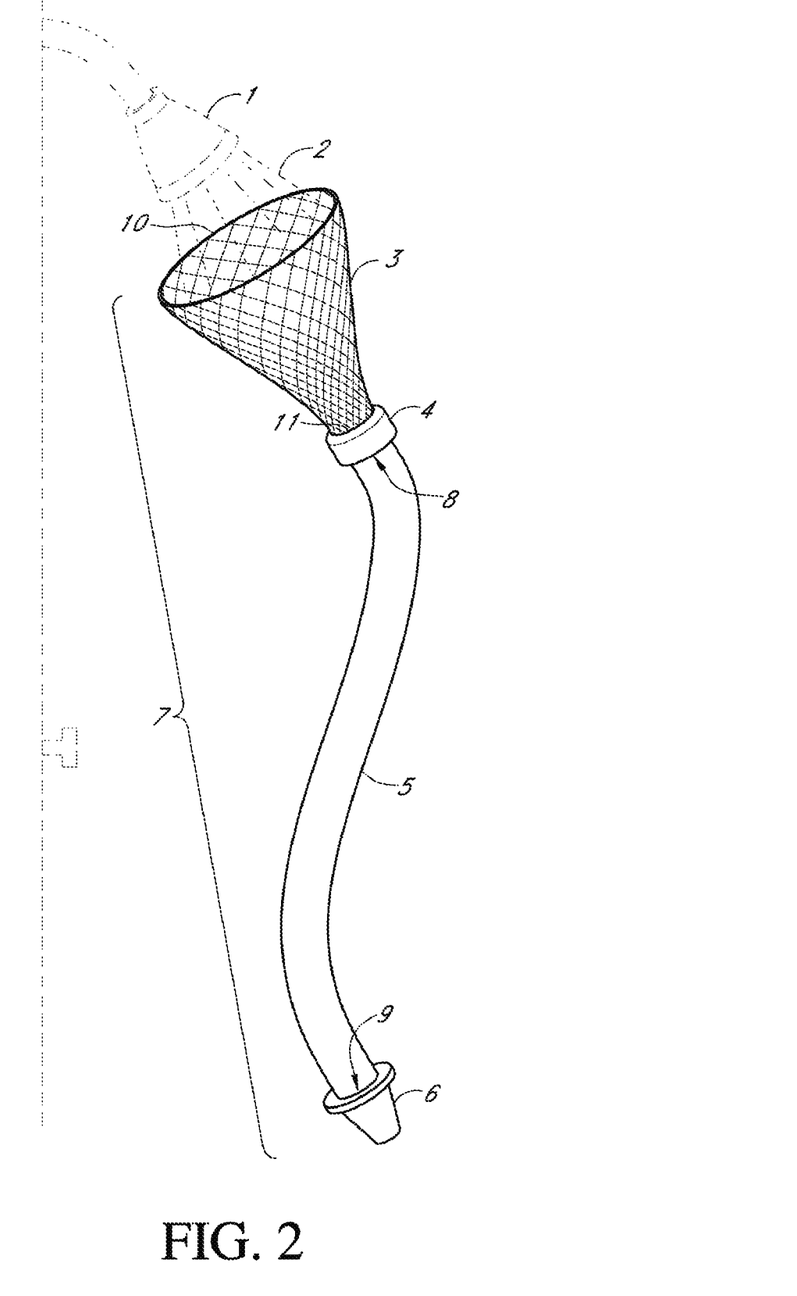
FIG. 2 is a view of the shower head and adapter of FIG. 1, depicting how the self-sealing connector can be stretched to fit over most any size a shower head, faucet or spigot thus creating a rinsing apparatus that can easily slip off and on and, for example, allowing the same converter hose to be used in many locations where a shower head, faucet or spigot may be found. Typically, the water may be turned off before the connector is fitted to the existing a shower head, faucet or spigot.
Figure 3:
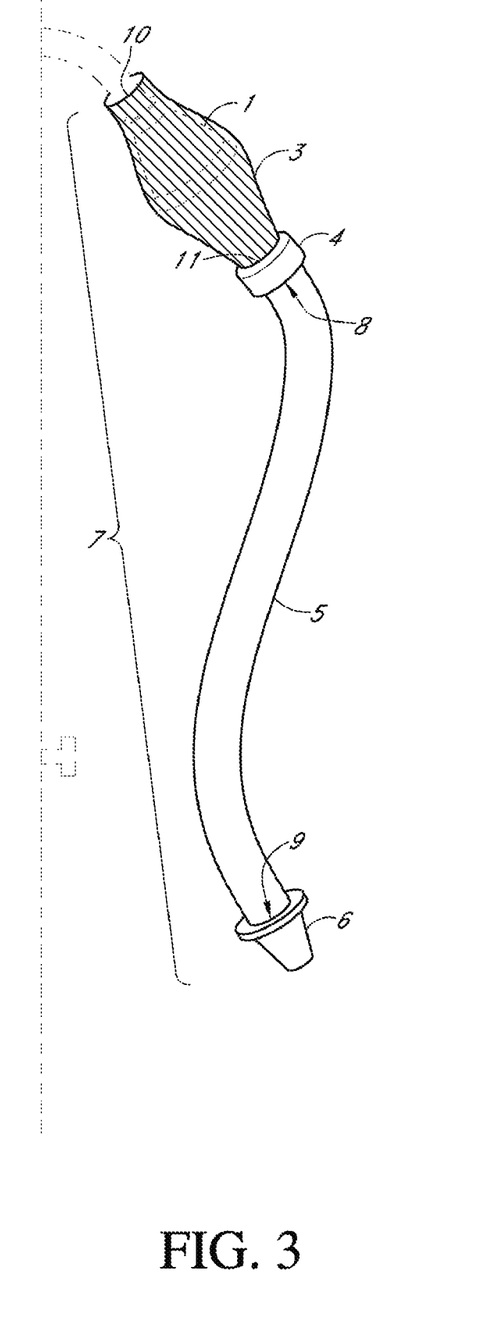
FIG. 3 is a view of the converter hose depicting the connector self-sealing about the shower head during use.
Figure 4:
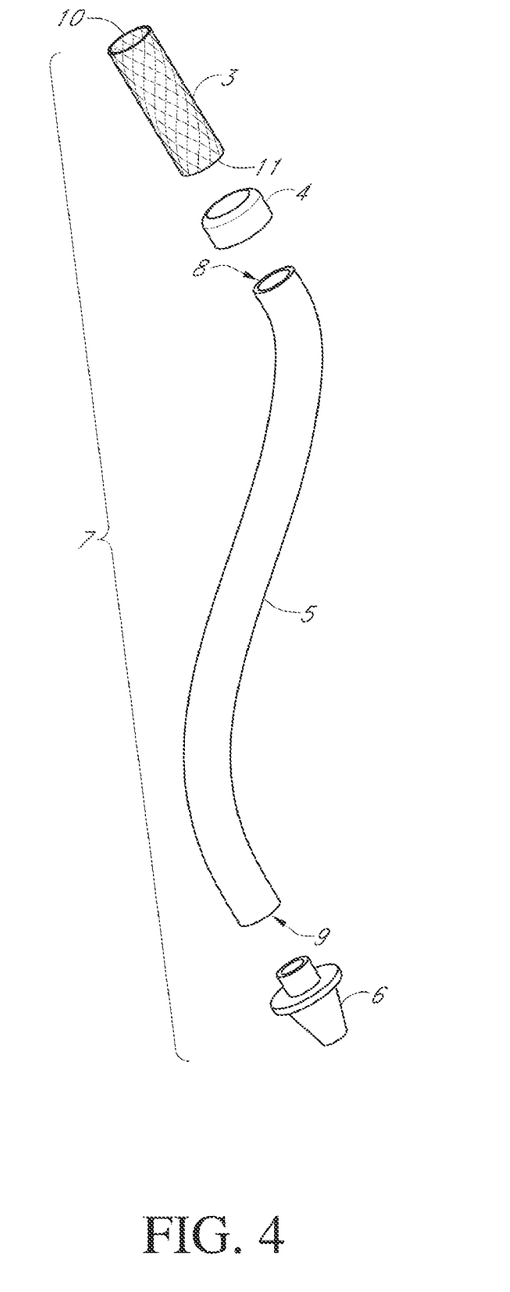
FIG. 4 illustrates the main components of an embodiment of the converter hose.
Figure 5:
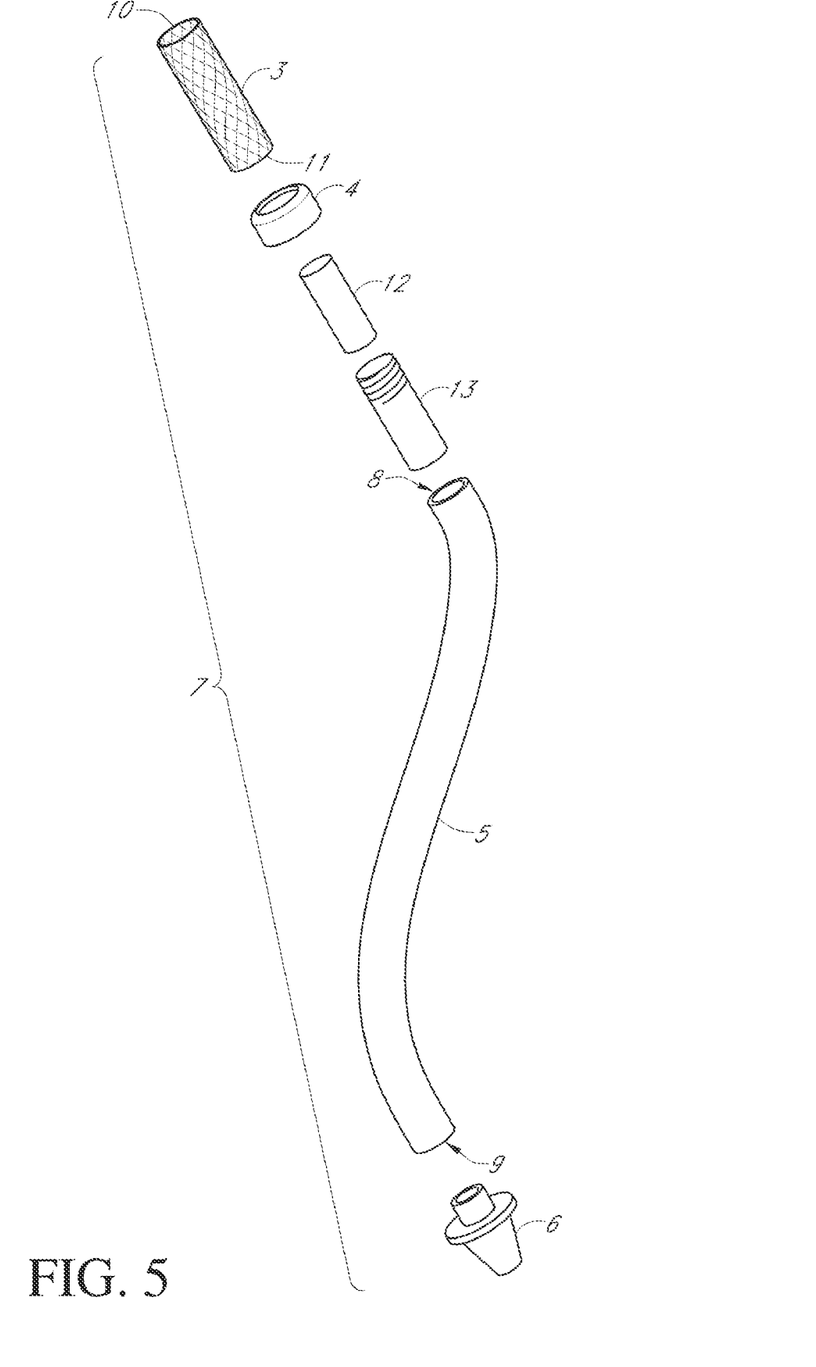
FIG. 5 illustrates an embodiment of female and male couplers connecting the connector to the hose.

In some aspects, instead of or in addition to the clamp, the distal end of the connector has a female coupler 12 and the first end of the hose has a male coupler 13 as shown in FIG. 5, or the distal end of the connector has a male coupler and the first end of the hose has a female coupler. In some aspects, the male or female coupler may be secured to the connector or hose, such as by a clamp 4 or glue or other securing means.

The hollow second end 9 may be connected to a hollow nozzle 6. In some aspects, if, for example, the hose is made from same material as the connector, a securing means such as a clamp, glue, and/or male and female couplers may be used to connect the hose to the nozzle. The male or female coupler proximate the hollow nozzle may be a separate part or may be integral with the nozzle. In some aspects, if, for example, the hose is made from a relatively more rigid material, a securing means may not be necessary. In some aspects, the hollow nozzle 6, if present, may be made from a rigid material such as plastic or metal, and open at both ends. In some aspects, the hollow nozzle 6 fits inside the second end of the hose 8, or the nozzle may be integral with the hose, for example if the hose is tapered proximate the second end. In some aspects, the hollow nozzle may be about ½"-3" in length such as about 1.5" in length. The width of the nozzle may depend on the size of the opening on the second end of the hose and may have corresponding sized openings. For example, the opening may be about to ¼" to ½" such as about ⅜" inner diameter and about ¼" to ½" such as about ⁷⁄₁₆" outer diameter, or larger such as ½" to 2½" or larger depending on the application. The thickness of the wall of the nozzle may be about ¹⁄₁₆"-⅛" in diameter, such as about ⅛" thick.

The converter hose may be manufactured in a variety of ways including but not limited to injection molding or extrusion. In some aspects, the converter hose may be manufactured in a single contiguous piece where both the connector and hose are comprised of similar material, but may allow for additional attachments to the distal hose end. The converter hose may be manufactured using different material for the connector and hose. In some aspects, the converter hose comprises at least two pieces. For example, the connector may be permanently or removeably attached, molded, clamped or screwed on to the hose component with or without male and female coupling members. In some aspects, coupling members may have corresponding parts such that one coupling member on the distal end of the connector may connect to a corresponding coupling member secured to the opening of the hose so that the connector may be removed from the hose. For example the connector and the hose may be threaded, coupled, or may snap or slide together in place.

The terms "showerhead, faucet or spigot" or "fixture" used alone or together is meant to include various fixtures that dispense a liquid, typically household water fixtures, such as bathroom basin faucets, bathtub spouts, kitchen or utility room sink faucets, showerheads, or outdoor spigots for hoses among other fixtures.

The terms "approximately" "about" and "substantially" as used herein represent an amount close to the stated amount that still performs the desired function or achieves the desired result. For example, the terms "approximately," "about" and "substantially" may refer to an amount that is within less than 10% of, within less than 5% of, within less than 1% of, within less than 0.1% of, and within less than 0.01% of the stated amount.

All patents and publications referenced herein are incorporated herein by reference.

EXAMPLES

Example 1

A TPE super elastic plastic cylindrical connector about 5" long and having about a 1" diameter in its resting state was coupled using a band to an approximately 3' silicone hose to make a converter hose. The converter hose was fitted over household fixtures of various sizes, namely:

a curved tub spout with an approximately 1.5" diameter round opening;

an approximately 1.5" diameter round water-saving shower head;

a standard tub spout that extends perpendicularly from the wall and curves to provide a downward flow of water and having an opening of approximately 1" square;

an approximately 3" diameter round shower head;

an approximately 7" diameter round shower head; and a rectangular tub spout measuring approximately 2" by 1.5".

The proximal open end of the connector was stretched about and affixed to each of the water fixtures above, roughly aligning the opening on the hose on the distal end of the connector in the same direction as the spout or faucet opening, allowing water to flow from the spout or faucet opening to the distal opening between the connector and the hose. The water handle for each fixture then was turned on to approximately one eighth of a full turn for 10 seconds, which delivered a medium pressure flow, which would be sufficient for rinsing the shower or tub, household items, and bathing animals, such as dogs. The same connector portion fitted over each of the fixtures did not leak at all except when used with the rectangular tub spout. The rectangular tub spout leaked 3 droplets initially until the connector was sealed to the spout after the water began to flow through the hose and exited the second end of the hose, at which time leakage ceased for the remainder of the 10 second test period. Measurement of the 3 droplets as a fractional amount of an ounce was difficult to approximate in the measuring vessel. Using a conversion calculator at the found at www.unitconversion.org/volume/drops-to-fluid-ounces-us-conversion.html, 3 drops of water converts to about 0.005 oz leakage.

Water flow rates from a shower head is typically about 1.5-2.5 gallons per minute (GPM), which converts to 3.2-5.3 ounces per second, while bath tub water flow rates are typically about 2.5-4 GPM or 5.3-8.5 ounces per second. Assuming the maximum typical flow weight or 85 ounces in 10 seconds had passed through the converter hose, means 0.005/85 or about 0.006% leakage for this fixture over 10 seconds. This percentage would be even lower if a weaker flow rate was used or the amount was calculated over the entire length of time the water was flowing. These experiments showed substantially no water leakage for fixtures of various sizes and shapes.

In addition to the experiments above, the converter hose was used at various water temperatures including typical showering temperatures of approximately 100-120° F. The connector did not become loosen from any of the fixtures or become deformed when water ran through the fixtures at these temperatures, or cause leaks due to heat.

Comparative Example 1a

The Danco 10086 Versa Spray Handheld Shower "Versa" was tested. The connector had a round opening and curved to meet the 42" vinyl hose such that the opening of the connector and the opening of the hose were approximately perpendicular relative to each other. The hose appeared to be made from a relatively rigid rubber. The converter hose was attempted to be fitted over the six household fixtures as in Example 1. The only faucet or shower head that was able to be fitted, although with significant difficulty, was a) the curved tub spout with an approximately 1.5" round opening. The connector portion was unable to fit over any other fixture. The water handle that regulates the flow of water for the curved tub spout was turned on to one eighth of a full turn for 10 seconds. Approximately 15 ounces of water was collected from the leak where the connector met the tub spout over a 10 second testing period. The leakage rate did not appear to slow down when the water flowed through Versa for more than 10 seconds.

Using the highest typical bath tub flow rates identified in Example 1 of 8.5 oz/sec, about 85 ounces of water would have flowed through the Versa from the tub spout in the 10 second testing period. The percent leakage is 15 oz/85 oz or about 18% leakage. Versa is available online on Amazon.com. Various Amazon.com reviewers of Versa stated "stiff top," "sprays water out the back," and "difficult to get on." The product packaging also notes that consumers with "weak arm strength" may have a difficult time using it.

Comparative Example 1b

Amazon.com offers Lasco 08-2180 Slip on to Faucet Rubber Hose and Spray "Lasco," that provides dimensions of "3.5×10.2×7.8 inches" and the customer question and answers states "the diameter of the end that attaches to the faucet . . . goes from 1½" down to ½"." Various Amazon.com reviewers of Lasco stated: "Keeps popping off the faucet," "Does not fit over tub faucet (which is why I ordered it), will fit sink though," "The nozzle fell off within five minutes," "doesn't fit or stay on any of my faucets," "you can't have the water pressure be too strong." "way to [sic] small to fit on any of my faucets."

Comparative Example 1c

Amazon.com offers Holmz-Selfix 04430201.04 Slip-On Portable Shower "Holmz," that provides dimensions of "2.5×9×15 inches" and the customer question and answers states "I tried to put this on a sink faucet, and on a garden hose faucet mouth. It was too big for both." The appearance is similar to Versa in comparative Example 1a. Various Amazon.com reviewers of Holmz stated: "The section that is supposed to 'fit' over the faucet is made of a hard thick material rather than a rubberized funnel that can fit tightly enough around the faucet . . . . Instead, no matter how you twist and turn and try to get it to cover the faucet, the end result is always water spout every which way except through the shower head!," "the product dimensions on Amazon did not reveal what is clearly printed on the package, that it fits faucets 1⅜" to 1¾" in diameter. My faucet is closer to 2," "my tub faucet spout is square and too wide for the attachment to fit over it," "doesn't fit anything in my apartment. The [sic] 'universal' end is so small that you can't even stretch it over any faucet," "If you use it with warm to hot water it get's [sic] soft and starts to come off the faucet. I had to use a ring clamp to keep it on.," "doesn't fit a square tub faucet," "Jumps off the faucet as soon as the water pressure increases beyond weak."

The invention claimed is:

1. A converter hose comprising
an elastomeric, self-sealing connector having a proximal end and a distal end;
wherein the distal end is coupled to a first end of a hose forming a passageway therethrough;
wherein the hose is more rigid than the elastomeric, self-sealing connector;
wherein the converter hose does not comprise a ring proximate the elastomeric, self-sealing connector;
wherein the elastomeric, self-sealing connector has a wall thickness of about 1/32" to ½".

2. The converter hose of claim 1
wherein the distal end is coupled to the first end of the hose with a coupler, and
wherein the coupler is not the ring.

3. The converter hose of claim 1
wherein the elastomeric, self-sealing connector has properties and dimensions wherein when in use a single elastomeric, self-sealing connector self seals about peripheries of a fixture terminating in a round opening and a fixture terminating in a rectangular opening.

4. The converter hose of claim 1
wherein the elastomeric, self-sealing connector comprises a thermoplastic elastomer having a durometer hardness Shore Type A or Shore Type OO value of about 1-50.

5. The converter hose of claim 1
wherein the elastomeric, self-sealing connector comprises a thermoplastic elastomer having a durometer hardness Shore Type A value of about 1-30.

6. The converter hose of claim 4
wherein the thermoplastic elastomer connector comprises a thermoplastic elastomer that has a tear strength of about 1-35 kN/m.

7. The converter hose of claim 2
wherein the wall thickness is about 1/16" to ¼",
wherein the elastomeric, self-sealing connector has a length of about 3-10 inches.

8. The converter hose of claim 1 wherein the hose comprises silicon or polyvinyl chloride.

9. The converter hose of claim 1 further comprising a nozzle attached to a second end of the hose.

10. The converter hose of claim 1 wherein a single elastomeric, self-sealing connector has properties and dimensions capable of self sealing about peripheries of fixtures comprising both a 3" diameter shower head and a 2" by 1.5" rectangular tub spout when in use.

11. The converter hose of claim 1 wherein the properties and the dimensions provide a surface area about peripheries of various sized fixtures to counter a force of a flow rate from the various sized fixtures when in use.

12. A method of using a converter hose comprising an elastomeric, self-sealing connector having a proximal end and a distal end;
wherein the distal end is coupled to a first end of a hose forming a passageway therethrough;
wherein the hose is more rigid than the elastomeric, self-sealing connector;
wherein the converter hose does not comprise a ring proximate the elastomeric, self-sealing connector;
wheren the method comprises attaching the proximal end of the elastomeric, self-sealing connector to a fixture; and
flowing water through the converter hose, wherein less than 1% of the water flowing through the converter hose escapes the proximal end of the elastomeric, self-sealing connector.

13. A method of using the converter hose of claim 1 comprising
flowing water through the converter hose, wherein less than 1% of the water flowing through the converter hose escapes the proximal end of the elastomeric, self-sealing connector.

14. The method of using the converter hose of claim 12 wherein the flowing step comprises flowing at a rate of 1.5-2.5 gallons per minute.

15. A method of using a converter hose comprising
an elastomeric, self-sealing connector having a proximal end and a distal end;
wherein the distal end is coupled to a first end of a hose forming a passageway therethrough;
wherein the hose is more rigid than the elastomeric, self-sealing connector;
wherein the converter hose does not comprise a ring proximate the elastomeric, self-sealing connector;
wheren the method comprises stretching the proximal end of the elastomeric, self-sealing connector about a fixture;
aligning the distal end of the elastomeric, self-sealing connector with an opening on the fixture; and
flowing a liquid from the fixture through the distal end of the elastomeric, self-sealing connector and through the hose;
wherein less than 1% of the liquid escapes the proximal end of the elastomeric, self-sealing connector during the flowing step.

16. A converter hose comprising
an elastomeric, self-sealing connector having a proximal end and a distal end;
wherein the distal end is coupled to a first end of a hose forming a passageway therethrough;
wherein the hose is more rigid than the elastomeric, self-sealing connector;
wherein the elastomeric, self-sealing connector has properties and dimensions wherein when in use a single elastomeric, self-sealing connector self seals about peripheries of a fixture terminating in a round opening and a fixture terminating in a rectangular opening. and
wherein the elastomeric, self-sealing connector has a wall thickness of about 1/32" to 1/2".

17. A converter hose comprising
an elastomeric, self-sealing connector having a proximal end and a distal end;
wherein the distal end is coupled to a first end of a hose forming a passageway therethrough;
wherein the hose is more rigid than the elastomeric, self-sealing connector;
wherein the elastomeric, self-sealing connector has properties and dimensions wherein when in use a single elastomeric, self-sealing connector self seals about peripheries of a fixture terminating in a round opening and a fixture terminating in a rectangular opening;
wherein the elastomeric, self-sealing connector has properties and dimensions wherein less than 1% of water flowing through the converter hose escapes the proximal end of the elastomeric, self-sealing connector when in use.

18. A converter hose comprising
an elastomeric, self-sealing connector having a proximal end and a distal end;
wherein the distal end is coupled to a first end of a hose forming a passageway therethrough;
wherein the hose is more rigid than the elastomeric, self-sealing connector wherein the elastomeric, self-sealing connector has a wall thickness of about 1/32" to 1/2";
wherein the elastomeric, self-sealing connector comprises a thermoplastic elastomer having a durometer hardness Shore Type A or Shore Type OO value of about 1-50.

19. A method of using the converter hose of claim 16 comprising flowing water through the converter hose, wherein less than 1% of the water flowing through the converter hose escapes the proximal end of the elastomeric, self-sealing connector.

20. A method of using the converter hose of claim 17 comprising flowing water through the converter hose, wherein less than 1% of the water flowing through the converter hose escapes the proximal end of the elastomeric, self-sealing connector.

* * * * *